(12) United States Patent
Hayami et al.

(10) Patent No.: US 7,095,940 B2
(45) Date of Patent: Aug. 22, 2006

(54) OPTICAL FIBER, METHOD FOR MANUFACTURING SAME AND OPTICAL TRANSMISSION CHANNEL

(75) Inventors: Shuhei Hayami, Tokyo (JP); Mitsuhiro Kawasaki, Tokyo (JP); Yohei Uchida, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 271 days.

(21) Appl. No.: 10/674,338

(22) Filed: Oct. 1, 2003

(65) Prior Publication Data

US 2005/0089289 A1 Apr. 28, 2005

(30) Foreign Application Priority Data

Oct. 1, 2002 (JP) ............................. 2002-288914
May 22, 2003 (JP) ............................. 2003-145204

(51) Int. Cl.
*G02B 6/00* (2006.01)
(52) U.S. Cl. ....................................... 385/137; 385/138
(58) Field of Classification Search ......... 385/137–138
See application file for complete search history.

(56) References Cited

U.S. PATENT DOCUMENTS

| | | | | |
|---|---|---|---|---|
| 5,044,724 A * | 9/1991 | Glodis et al. ............... | 385/127 |
| 5,115,486 A * | 5/1992 | Bader et al. ................. | 385/124 |
| 5,781,673 A * | 7/1998 | Reed et al. .................... | 385/24 |
| 6,317,551 B1 * | 11/2001 | Mitchell et al. ............. | 385/124 |
| 6,535,677 B1 * | 3/2003 | Tanaka et al. ............... | 385/123 |
| 6,810,185 B1 * | 10/2004 | Qi et al. ...................... | 385/127 |
| 6,842,566 B1 * | 1/2005 | Ishikawa et al. .............. | 385/37 |
| 2002/0018631 A1 * | 2/2002 | Arai et al. ................... | 385/127 |
| 2002/0097970 A1 * | 7/2002 | Sasaoka ....................... | 385/123 |
| 2003/0044148 A1 * | 3/2003 | Berkey et al. ............... | 385/124 |
| 2003/0063878 A1 * | 4/2003 | Matsuo et al. ............... | 385/123 |
| 2004/0151455 A1 * | 8/2004 | Nagayama et al. ......... | 385/127 |

* cited by examiner

*Primary Examiner*—Ellen E. Kim
(74) *Attorney, Agent, or Firm*—Oblon, Spivak, McClelland, Maie & Neustadt, P.C.

(57) ABSTRACT

The present invention provides an optical fiber of which a zero dispersion wavelength falls within a range of between 1,250 nm and 1,350 nm inclusive, transmission loss at 1,550 nm is equal to or less than 0.185 dB/km, chromatic dispersion at 1,550 nm is within the range of 19±1 ps/nm·km, a dispersion slope at 1,550 nm is equal to or less than 0.06 ps/nm²·km, an effective area $A_{eff}$ is equal to or more than 105 µm², a cable cutoff wavelength $\lambda_{cc}$ is equal to or less than 1,530 nm, polarization mode dispersion is equal to or less than 0.1 ps/km$^{1/2}$, and a loss when the optical fiber is wound on a mandrel having an outer diameter of 20 mm is equal to or less than 10 dB/m.

8 Claims, 7 Drawing Sheets

SIGNAL PROPAGATION DIRECTION D

FIG. 8

Table 5 List of characteristics of Present invention examples and Comparison example

| | Δ1 (%) | Δ2 (%) | First clad (%) | A/B | dispersion (ps/nm·km) | dispersion slope (ps/nm²·km) | Transmission loss (dB/km) | Aeff (μm²) | λcc (nm) | Transmission channel |
|---|---|---|---|---|---|---|---|---|---|---|
| Example 3 of Present invention | -0.05 | -0.20 | -0.35 | 0.50 | 18.2 | 0.068 | 0.170 | 102 | 1420 | ○ |
| Example 4 of Present invention | -0.15 | -0.40 | -0.45 | 0.70 | 19.8 | 0.067 | 0.174 | 97 | 1460 | ○ |
| Example 5 of Present invention | 0.20 | -0.05 | -0.18 | 0.35 | 17.9 | 0.064 | 0.178 | 103 | 1530 | ○ |
| Comparison example | 0.28 | 0.00 | - | - | 21.9 | 0.068 | 0.195 | 133 | 1580 | × |

OPTICAL FIBER, METHOD FOR MANUFACTURING SAME AND OPTICAL TRANSMISSION CHANNEL

BACKGROUND OF THE INVENTION

1. Field of the Invention

The present invention relates to an optical fiber, a method for manufacturing same and an optical transmission channel. Particularly, the present invention relates to an optical fiber used in optical communications of a long-haul large-capacity transmission system using wavelength division multiplexing (WDM) technology, an unrepeated submarine optical cable system or the like, a method for manufacturing same, and an optical fiber and an optical transmission channel used in the wavelength division multiplexing (WDM) optical transmission.

2. Related Art

Usually, a wavelength used of an optical transmission signal on a single-mode optical fiber (SMF) for optical transmission is often in the vicinity of 1,300 nm (1.3 μm) or 1,550 nm (1.55 μm), while a wavelength used for a WDM transmission optical fiber is 1,550 nm (1.55 μm) where transmission loss decreases.

Recent yeas have seen development of a WDM transmission system as well as growing demands for suppression of non-linearity and suppression of dispersion.

In such a situation, there ha been proposed for long-haul large-capacity transmission fibers, a dispersion managed transmission channel comprising a combination of an optical fiber 1 provided at the anterior portion having an increased effective area ($A_{eff}$), positive chromatic dispersion and a positive dispersion slope and an optical fiber 2 provided at the posterior portion having negative chromatic dispersion and a negative dispersion slope, as shown in FIG. 1, to achieve lower residual dispersion as a whole.

In addition, an optical fiber having increased effective area ($A_{eff}$) is also utilized in an unrepeated submarine optical cable system used for communication between near-sea islands so as to suppress non-linearity.

Known as a manufacturing method of these WDM transmission single-mode optical fibers are some compositing methods such as a VAD (Vapor-phase Axial Deposition) method, an OVD (Outside Vapor Deposition) method, an MCVD (Modified Chemical Vapor Deposition) method and a method of combination thereof.

Further, as a method for increasing transmission capacity in optical transmission by use of an optical fiber, attention is focused on WDM optical transmission. Accordingly, much consideration has been made on optical fibers used in the WDM optical transmission.

Known as an optical fiber usable in the WDM optical transmission are a single-mode optical fiber (SMF) having zero dispersion wavelength in the vicinity of 1.3 μm, a non-zero dispersion shifted optical fiber (NZDSF) having no zero dispersion wavelength in the used wavelength range and the like. However, in these optical fibers, there is a problem of non-linearity such as self-phase modulation (SPM) or cross-phase modulation (XPM).

In order to solve the problem of non-linearity for the optical fibers described above, there has developed an optical fiber having a chromatic dispersion that is sufficiently far from zero and an increased effective area ($A_{eff}$). The effective area is expressed by the equation $(MFD)^2 \times \pi \times k/4$, where k is a constant number. An example of such an optical fiber is disclosed in Proceedings of the 1999 IEICE Electronics Society Conference, C-3-76 and C-3-77.

Such an optical fiber as disclosed in the above-mentioned proceedings has a chromatic dispersion of more than 20 ps/nm/km. Because of this chromatic dispersion, the accumulated dispersion is increased, which makes the optical fiber unsuitable for long-haul WDM optical transmission.

SUMMARY OF THE INVENTION

A first aspect of the present invention is an optical fiber in which a zero dispersion wavelength falls within a range of between 1,250 nm and 1,350 nm inclusive, transmission loss at 1,550 nm is equal to or less than 0.185 dB/km, chromatic dispersion at 1,550 nm is within the range of 19±1 ps/nm·km, a dispersion slope at 1,550 nm is equal to or less than 0.06 ps/nm²·km, an effective area $A_{eff}$ at 1,550 nm is equal to or more than 105 μm², a cable cutoff wavelength $\lambda_{cc}$ is equal to or less than 1,530 nm, polarization mode dispersion at 1550 nm is equal to or less than 0.1 ps/km$^{1/2}$, and a macrobending loss at 1,550 nm when the optical fiber is wound on a mandrel having an outer diameter of 20 mm is equal to or less than 10 dB/m.

A second aspect of the present invention is an optical fiber including:

a first region provided in a center of the optical fiber, having a refractive index difference Δn1 relative to a refractive index n0 of silica and an outer diameter of a;

a second region formed around said first region, having a refractive index difference Δn2 relative to the refractive index n0 of silica and an outer diameter of b;

a third region formed around said second region, having a refractive index difference Δn3 relative to the refractive index n0 of silica and an outer diameter of c;

a fourth region formed around said third region, having a refractive index difference Δn4 relative to the refractive index n0 of silica and an outer diameter of d; and a fifth region formed around said fourth region, having a refractive index difference Δn5 relative to the refractive index n0 of silica and an outer diameter of e, in which the refractive index differences Δn1 through Δn5 satisfy a relationship as follows:

Δn2<Δn4<Δn3<Δn1

Δn1, Δn2, Δn3, Δn4<0

Δn5>0

A third aspect of the present invention is an optical fiber according to the second aspect, in which the outer diameter a of said first region, the outer diameter b of said second region and the outer diameter c of said third region satisfy a relationship as follows:

1.20≦b/a≦2.00

1.44≦c/a≦4.00.

A fourth aspect of the present invention is an optical fiber according to the second aspect, in which the refractive index differences Δn1, Δn2 and Δn3 are defined as follows:

−0.1%<Δn1<0%

−0.5%≦Δn2≦−0.2%

−0.4%≦Δn3≦−0.1%.

A fifth aspect of the present invention is an optical fiber according to the second aspect, in which the outer diameter e of said fifth region and the outer diameter d of said fourth region satisfy a relationship as follows:

$$0.040 \leq \{(e-d)/2\}/e \leq 0.096.$$

A six aspect of the present invention is an optical fiber according to the second aspects in which the outer diameter e of said fifth region and the outer diameter d of said fourth region satisfy a relationship as follows:

$$e = 125 \ \mu m$$

$$5 \ \mu m \leq \{(e-d)/2\} \leq 12 \ \mu m.$$

A seventh aspect of the present invention is an optical fiber including:

a first region provided in a center of the optical fiber, having a germanium concentration of $C_{Ge1}$ (mol %) and a fluorine concentration of $C_{F1}$ (mol %);

a second region formed around said first region, having a germanium concentration of $C_{Ge2}$ (mol %) and a fluorine concentration of $C_{F2}$ (mol %);

a third region formed around said second region, having a germanium concentration of $C_{Ge3}$ (mol %) and a fluorine concentration of $C_{F3}$ (mol %);

a fourth region formed around said third region, having a germanium concentration of $C_{Ge4}$ (mol %) and a fluorine concentration of $C_{F4}$ (mol %); and a clad portion formed around said fourth region, in which the germanium concentrations $C_{Ge1}$ through $C_{Ge4}$ and fluorine concentrations $C_{F1}$ through $C_{F4}$ satisfy a relationship as follows:

$$-0.1 < 0.096 \times C_{Ge1} - 0.398 \times C_{F1} < 0$$

$$-0.5 \leq 0.096 \times C_{Ge2} - 0.398 \times C_{F2} \leq -0.2$$

$$-0.4 \leq 0.096 \times C_{Ge3} - 0.398 \times C_{F3} \leq -0.1$$

$$-0.5 < 0.096 \times C_{Ge4} - 0.398 \times C_{F4} < -0.1$$

An eighth aspect of the present invention is an optical fiber according to the seventh aspect, in which the germanium concentrations $C_{Ge1}$ through $C_{Ge4}$ and fluorine concentrations $C_{F1}$ through $C_{F4}$ satisfy a relationship as follows:

$$C_{Ge1}, C_{Ge2}, C_{Ge3}, C_{Ge4} = 0$$

$$C_{F1}, C_{F2}, C_{F3}, C_{F4} > 0.$$

A ninth aspect of the present invention is an optical fiber according to the seventh aspect, in which the germanium concentrations $C_{Ge1}$ through $C_{Ge4}$ and fluorine concentrations $C_{F1}$ through $C_{F4}$ satisfy a relationship as follows:

$$C_{Ge1}, C_{F1} > 0$$

$$C_{Ge2}, C_{Ge3}, C_{Ge4} = 0$$

$$C_{F2}, C_{F3}, C_{F4} > 0.$$

A tenth aspect of the present invention is an optical fiber according to the seventh aspect, in which the germanium concentrations $C_{Ge1}$ through $C_{Ge4}$ and fluorine concentrations $C_{F1}$ through $C_{F4}$ satisfy a relationship as follows:

$$C_{Ge1}, C_{F1} > 0$$

$$C_{Ge2} = 0, C_{F2} > 0$$

$$C_{Ge3}, C_{F3} > 0$$

$$C_{Ge4} = 0, C_{F4} > 0$$

An eleventh aspect of the present invention is a method for manufacturing an optical fiber which includes:

a first region provided in a center of the optical fiber, having a refractive index difference Δn1 relative to a refractive index n0 of silica and an outer diameter of a;

a second region formed around said first region, having a refractive index difference Δn2 relative to the refractive index n0 of silica and an outer diameter of b;

a third region formed around said second region, having a refractive index difference Δn3 relative to the refractive index n0 of silica and an outer diameter of c;

a fourth region formed around said third region, having a refractive index difference Δn4 relative to the refractive index n0 of silica and an outer diameter of d; and a fifth region formed around said fourth region, having a refractive index difference Δn5 relative to the refractive index n0 of silica and an outer diameter of e, in which the refractive index differences Δn1 through Δn5 satisfy a relationship as follows:

Δn2<Δn4<Δn3<Δn1

Δn1, Δn2, Δn3, Δn4<0

Δn5>0, a zero dispersion wavelength of the optical fiber falls within a range of between 1,250 nm and 1,350 nm inclusive, the first region has a germanium concentration of $C_{Ge1}$ (mol %) and a fluorine concentration of $C_{F1}$ (mol %), the second region has a germanium concentration of $C_{Ge2}$ (mol %) and a fluorine concentration of $C_{F2}$ (mol %), the third region has a germanium concentration of $C_{Ge3}$ (mol %) and a fluorine concentration of $C_{F3}$ (mol %), the fourth region has a germanium concentration of $C_{Ge4}$ (mol %) and a fluorine concentration of $C_{F4}$ (mol %), and the germanium concentrations $C_{Ge1}$ through $C_{Ge4}$ and the fluorine concentrations $C_{F1}$ through $C_{F4}$ satisfy a relationship as follows:

$$-0.1 < 0.096 \times C_{Ge1} - 0.398 \times C_{F1} < 0$$

$$-0.5 \leq 0.096 \times C_{Ge2} - 0.398 \times C_{F2} \leq -0.2$$

$$-0.4 \leq 0.096 \times C_{Ge3} - 0.398 \times C_{F3} \leq -0.1$$

$$-0.5 < 0.096 \times C_{Ge4} - 0.398 \times C_{F4} < -0.1,$$

said method wherein, in synthesizing soots which are to be said first through fourth regions, respective soot synthetic raw materials including silica are doped with predetermined amounts of germanium and/or fluorine to synthesize the soots, and in vitrification of the synthesized soots to form a transparent glass, the soots are sintered in an atmosphere including fluorine and/or chlorine.

A twelfth aspect of the present invention is a method according to the eleventh aspect including:

a first step of synthesizing a first soot, which is to be the first region, and heating and vitrifying the first soot to form a first glass;

a second step of synthesizing a second soot, which is to be the second region, around the first glass formed at said first step and heating and vitrifying an obtained first glass-soot composite to form a first composite glass;

a third step of synthesizing a third soot, which is to be the third region, around the first composite glass formed at said second step and heating and vitrifying an obtained second glass-soot composite to form a second composite glass;

a fourth step of synthesizing a fourth soot, which is to be the fourth region, around the second composite glass formed at said third step and heating and vitrifying an obtained third glass-soot composite to form a third composite glass;

a fifth step of synthesizing a fifth soot, which is to be the fifth region, around the third composite glass formed at said fourth step and heating and vitrifying an obtained fourth glass-soot composite to form a fourth composite glass, which is then formed into an optical fiber preform; and a sixth step of heating and drawing an end of the optical fiber preform to form the optical fiber.

A thirteenth aspect of the present invention is an optical fiber in which an absolute value of a chromatic dispersion at 1,550 nm falls with a range of between 4 ps/nm·km and 20 ps/nm·km inclusive, a dispersion slope at 1,550 nm falls with a range of between 0.05 ps/nm²·km and 0.08 ps/nm²·km inclusive, transmission loss at 1,550 nm is equal to or less than 0.2 dB/km, and an effective area $A_{eff}$ at 1,550 nm is equal to or more than 80 μm².

A fourteenth aspect of the present invention is an optical fiber including a center core provided in a center of the optical fiber, having a refractive index difference Δ1 relative to a refractive index n0 of silica and an outer diameter of A;

a side core formed around said center core, having a refractive index difference Δ2 relative to the refractive index n0 of silica and an outer diameter of B;

a first clad formed around said side core, having a refractive index difference Δ3 relative to the refractive index n0 of silica; and a second clad formed around said first clad, and in which the refractive index differences Δ1 through Δ3 satisfy a relationship as follows: Δ1>Δ2>Δ3

A fifteenth aspect of the present invention is an optical fiber according to the fourteenth aspect, in which the refractive index differences Δn1, Δn2 and Δn3 are defined as follows:

$$-0.20\% \leq \Delta 1 \leq 0.20\%$$

$$-0.45\% \leq \Delta 2 \leq -0.05\%$$

$$-0.50\% \leq \Delta 3 \leq -0.20\%.$$

A sixteenth aspect of the present invention is an optical fiber according to the fourteenth aspect, in which the outer diameter A of said center core and the outer diameter B of said side core satisfy a relationship as follows:

$$0.3 \leq A/B \leq 0.8, \text{ and}$$

a viscosity of said second clad is higher than a viscosity of said center core.

A seventeenth aspect of the present invention is an optical transmission channel of which an optical fiber according to the first or second aspect of the present invention is used in at least one part.

A eighteenth aspect of the present invention is an optical transmission channel of which an optical fiber according to the thirteenth or fourteenth aspect of the present invention is used in at least one part.

BRIEF DESCRIPTION OF THE DRAWINGS

FIG. 8 is a table of characteristics of an example of the present invention and the comparative example.

DETAILED DESCRIPTION OF THE INVENTION

Preferred embodiments of an optical fiber and a manufacturing method of the same according to the present invention will be described below with reference to the accompanied drawings.

It is an object of the present invention to provide a low transmission loss optical fiber having a zero dispersion wavelength in the vicinity of 1,300 nm (1.3 μm) and a manufacturing method of the same. More specifically, it is to provide an optical fiber of a zero dispersion wavelength in the vicinity of 1,300 nm (1.3 μm), which have excellent transmission characteristics when being applied to a dispersion-managed optical transmission channel, and a manufacturing method of the same.

First Embodiment

Figure 1:
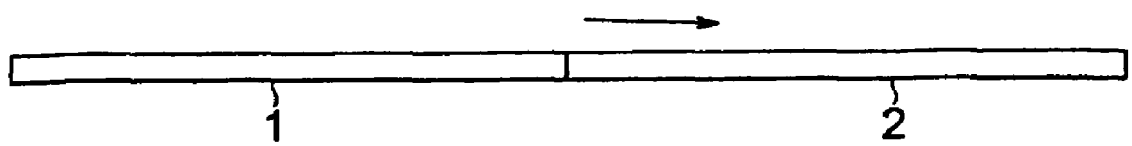
FIG. 1 is a view illustration a configuration of a dispersion-managed optical transmission channel to which is applied an optical fiber of the present invention.

Description is made, as one embodiment of an optical fiber according to the present invention, about an optical fiber 1 provided at the anterior portion of a dispersion-managed optical transmission channel shown in FIG. 1, that is, WDM transmission single-mode optical fiber 1.

The dispersion-managed optical transmission channel shown in FIG. 1 comprises a combination of an optical fiber 1 provided at the anterior portion having an increased effective area ($A_{eff}$), positive chromatic dispersion and a positive dispersion slope and an optical fiber 2 provided at the posterior portion having negative chromatic dispersion and a negative dispersion slope to achieve low residual dispersion as a whole.

Configuration and Characteristics of Optical Fiber

Figure 2:
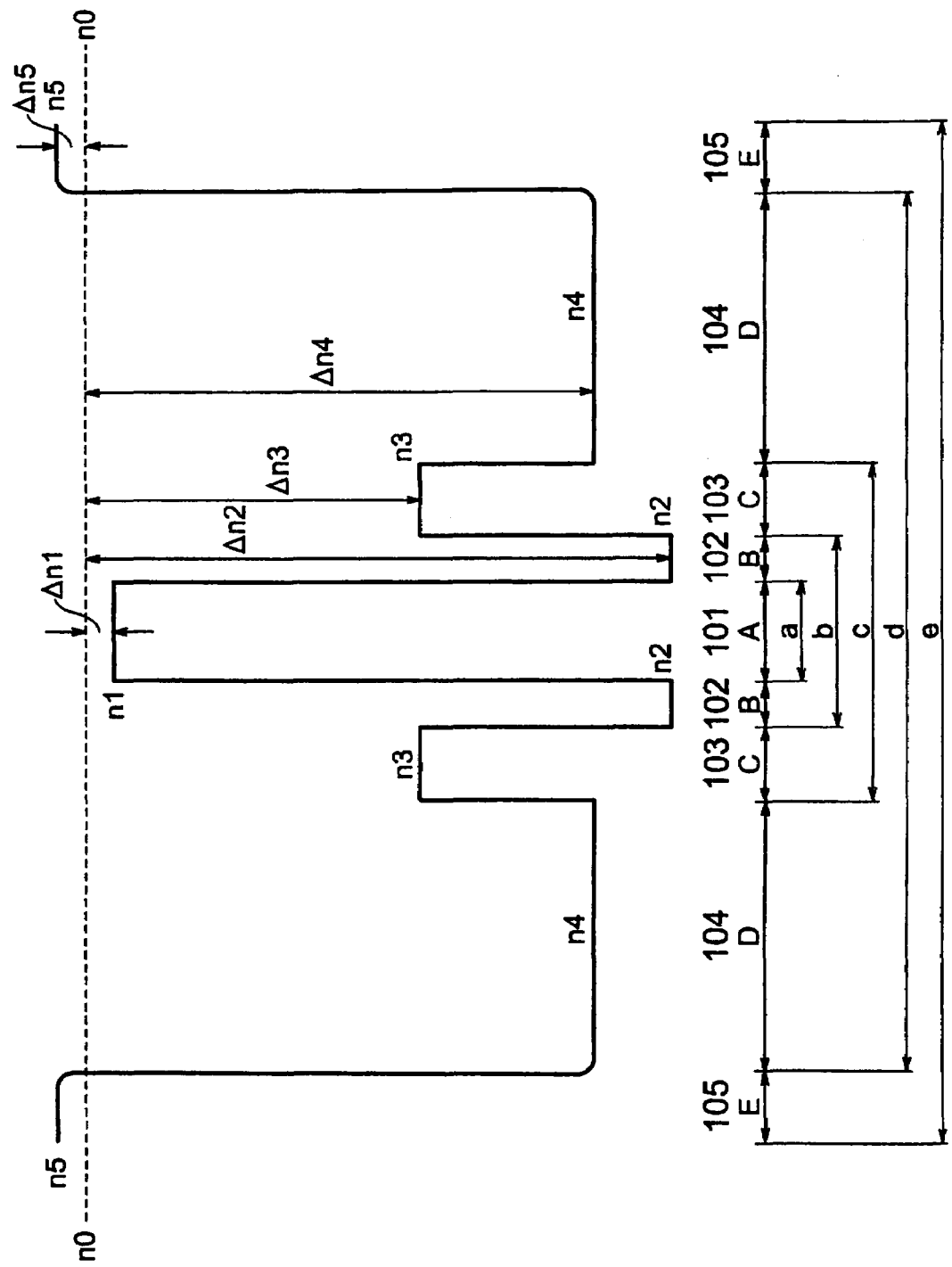
FIG. 2 is a view showing a configuration and refractive index distribution of an optical fiber according to a first embodiment of the present invention.

FIG. 2 shows a configuration of a WDM transmission single-mode optical fiber (SMF) 1 with zero dispersion wavelength in the vicinity of 1300 nm (1.3 μm), having an increased effective area ($A_{eff}$), positive chromatic dispersion and a positive dispersion slope, and a refractive index profile thereof according to the first embodiment of the present invention.

The optical fiber shown in FIG. 2 has a first region (A) (or a first core portion or a first optical signal propagation region) 101 positioned in the center of the optical axis of the optical fiber, a second region (B) (or a second core portion or a second optical signal propagation region) 102 formed around the first region (A) 101, a third region (C) (or a third core portion or a third optical signal propagation region) 103 formed around the second region (B) 102, a fourth region (D) (or a fourth core portion or a fourth optical signal propagation region) 104 formed around the third region (C) 103 and a fifth region (E) (or a cladding portion or an outermost layer region) 105 formed around the fourth region (D) 104.

An optical fiber as a final product is covered with a protective resin around the outermost layer region 105 thereof, however its illustration is omitted herein.

The first region (A) 101 has diameter of "a" and refractive index of "n1". The second region has outer diameter of "b" and refractive index of "n2". The third region has outer diameter of "c" and refractive index of "n3". The fourth region has outer diameter of "d" and refractive index of "n4". The fifth region has outer diameter of "e" and refractive index of "n5".

The refractive index of a silica glass which is not doped with a dopant for increasing or decreasing the refractive index is assumed as having a refractive index of n0 of reference.

Relative refractive index differences (first through fifth relative refractive index differences) $\Delta 1$ through $\Delta 5$ between the reference refractive index n0 and respective refractive indexes $\Delta n1$ through $\Delta n5$ are defined by the following equation 1.

$$\Delta n1 = \frac{n1^2 - n0^2}{2n1^2} \simeq \frac{n1 - n0}{n1}$$
$$\Delta n2 = \frac{n2^2 - n0^2}{2n2^2} \simeq \frac{n2 - n0}{n2}$$
$$\Delta n3 = \frac{n3^2 - n0^2}{2n3^2} \simeq \frac{n3 - n0}{n3}$$
$$\Delta n4 = \frac{n4^2 - n0^2}{2n4^2} \simeq \frac{n4 - n0}{n4}$$
$$\Delta n5 = \frac{n5^2 - n0^2}{2n5^2} \simeq \frac{n5 - n0}{n5}$$

Equation 1

An optical fiber according to the first embodiment of the present invention is configured of three optical-signal propagation layers as follows:

(1) The first region (A) (or a first core portion or a first optical signal propagation region) 101 positioned in the center of the optical fiber, of which the refractive index difference relative to the refractive index n0 of silica is a first relative refractive index difference $\Delta n1$ less than 0 and the outer diameter is a.

(2) The second region (B) (or a second core portion or a second optical signal propagation region) 102 formed around the first region (A) 101, of which the refractive index difference relative to the refractive index n0 of silica is a second relative refractive index difference $\Delta n2$ less than 0, an absolute value of the second relative refractive index difference $\Delta n2$ being more than an absolute value of the first relative refractive index difference $\Delta n1$, and the outer diameter is b.

(3) The third region (C) (or a third core portion or a third optical signal propagation region) 103 formed around the second region (B) 102, of which the refractive index difference relative to the refractive index n0 of silica is a third relative refractive index difference $\Delta n3$ less than 0, an absolute value of the third relative refractive index difference $\Delta n3$ being less than the absolute value of the second relative refractive index difference $\Delta n2$ and more than the absolute value of the first relative refractive index difference $\Delta n1$, and the outer diameter is c.

(4) The fourth region (D) (or a fourth core portion or a fourth optical signal propagation region) 104 formed around the third region (C) 103, of which the refractive index difference relative to the refractive index n0 of silica is a fourth relative refractive index difference $\Delta n4$ less than 0, an absolute value of the fourth relative refractive index difference $\Delta n4$ being more than the absolute value of the third relative refractive index difference $\Delta n3$ and less than the absolute value of the second relative refractive index difference $\Delta n2$, and the outer diameter is d.

(5) The fifth region (E) (or an outermost layer region or a cladding portion) 105 formed around the fourth region (D) 104, of which the refractive index difference relative to the refractive index n0 of silica is a fifth relative refractive index difference $\Delta n5$ more than 0 and the outer diameter is e.

Relation of the refractive indexes n0 through n5 and that of the relative refractive index differences $\Delta n1$ $\Delta n5$ through are expressed as follows:

n5>n0>n1>n3>n4>n2

$\Delta n1<0$
$/\Delta n2/>/\Delta n1/$, $\Delta n2<0$
$/\Delta n3/</\Delta n2/$, $/\Delta n3/>/\Delta n1/$, $\Delta n3<0$
$/\Delta n4/>/\Delta n3/$, $/\Delta n4/</\Delta n2/$, $\Delta n4<0$
$\Delta n5>0$ Transmission Characteristics Based on consideration by the inventors of the present application, characteristic requirements (1) for an optical fiber having a zero dispersion in the vicinity of 1.3 μm (1,300 nm) according to the first embodiment are listed below.

Characteristic Requirements (1)

(1) Transmission loss: 0.185 dB/km or less at 1,550 nm
(2) Chromatic dispersion: 19±1 ps/nm·km at 1,550 nm
(3) Dispersion slope: within the range of 0.06±0.01 ps/nm²·km at 1,550 nm
(4) Effective area $A_{eff}$: 105 μm² or more at 1,550 nm
(5) Cable cutoff wavelength $\lambda_{cc}$: 1,530 nm or less
(6) Macrobending loss on mandrel having an outer diameter of 20 mm: 10 dB/m or less Grounds for the characteristic requirements (1) shown above are described below.

(a) The inventors of the present application intensively conducted experiments on and considered optical fibers comprising in WDM transmission channels, which results have seen that in an optical fiber suitable as a single-mode optical fiber having a zero dispersion wavelength in the vicinity of 1300 nm (1.3 μm), a cable cutoff wavelength $\lambda_{cc}$ is 1,530 nm or less and a macrobending loss on mandrel having an outer diameter of 20 mm (20 mmφ) is 10 dB/m or less while an effective area $A_{eff}$ is 105 μm² or more, thereby enabling large capacity transmission with non-linearity effect being suppressed.

(b) In addition, chromatic dispersion at 1,550 nm is set at 19±1 ps/nm·km and transmission loss at the wavelength of 1,550 nm is set at 0.185 dB/km or less, thereby enabling an average transmission loss to be reduced all over the transmission channel illustrated in FIG. 1.

Outer Diameter Ratio

As characteristic requirements (2), a ratio of the outer diameter b of the second region (B) 102 to the outer diameter a of the first region (A) 101, that is, b/a, and a ratio of the outer diameter c of the third region (C) 103 to the outer diameter a of the first region (A) 101, that is, c/a are preferably determined as below:

Characteristic Requirements (2)

$$1.20 \leq b/a \leq 2.00, \text{ and } 1.44 \leq c/a \leq 4.00$$

Following description is made about requirements for the outer diameter ratio. When the outer diameter ratios b/a and c/a are set 2.00 or less and 1.44 or more, respectively, it is possible to enlarge an effective area $A_{eff}$ without any increase in a macrobending loss.

Further, when the outer diameter ratio b/a is set at 1.20 or more and the outer diameter ratio c/a is set at 4.00 or less, the cable cutoff wavelength $\lambda_{cc}$ is allowed to be shortened to less than 1,530 nm (1.53 µm).

Thus, by setting the outer diameter a of the fist region (A) 101, the outer diameter b of the second region (B) 102 and the outer diameter c of the third region (C) 103 so as to satisfy with the inequalities of the characteristic requirements (2), it is possible to achieve a large-capacity single-mode optical fiber.

Relative Refractive Index Difference

As characteristic requirements (3), description is made about refractive index differences Δn1 through Δn4 of the refractive indexes of the first region 101 through four region 104 relative to the refractive index of silica.

Characteristic Requirements (3)

$$-0.1\% < \Delta n1 < 0\%$$

$$-0.5\% \leq \Delta n2 \leq -0.2\%$$

$$-0.4\% \leq \Delta n3 \leq -0.1\%$$

$$|\Delta n4|>|\Delta n3|, |\Delta n4|<|\Delta n2|, \Delta n4<0$$

Requirements for the relative refractive index differences are described below.

When the first relative refractive index difference Δn1 is set at a negative value more than −0.1%, the second relative refractive index difference Δn2 is set at −0.5% or more, the third relative refractive index difference Δn3 is set at −0.4% or more, an absolute value of the fourth relative refractive index difference Δn4 is set at a negative value more than an absolute value of the third relative refractive index difference Δn3 and less than an absolute value of the second relative refractive index difference Δn2, it becomes possible to prevent the transmission loss in the optical fiber from increasing while increasing an effective area $A_{eff}$.

Here, the second relative refractive index difference Δn2 is equal to or less than −0.2% and the third relative refractive index difference Δn3 is equal to or less than −0.1%. These settings are made because, if the second relative refractive index difference Δn2 was more than −0.2% and the third relative refractive index difference Δn3 was more than −0.1%, a cable cutoff wavelength would be longer than 1,550 nm (1.5 µm).

Since a cladding portion (or the fifth region (E)) 105 is provided as an outermost layer of the optical fiber, it is possible to dissipate tension which is applied on the core portion during drawing as described later. Therefore, the tension during fiber drawing can be readily controlled.

Figure 4:
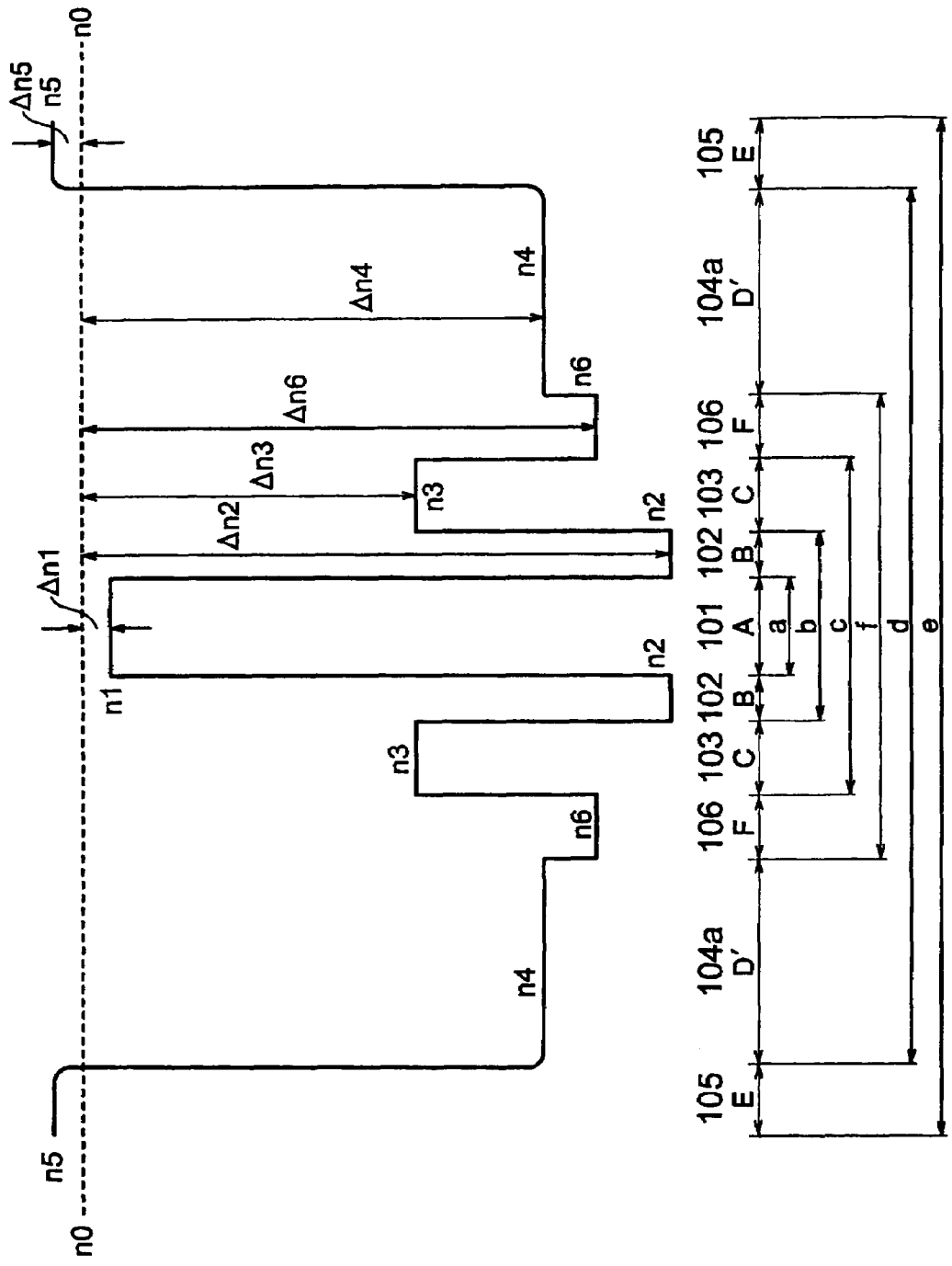
FIG. 4 is a view showing a configuration and refractive index distribution of an optical fiber according to a second embodiment of the present invention.
Figure 5:
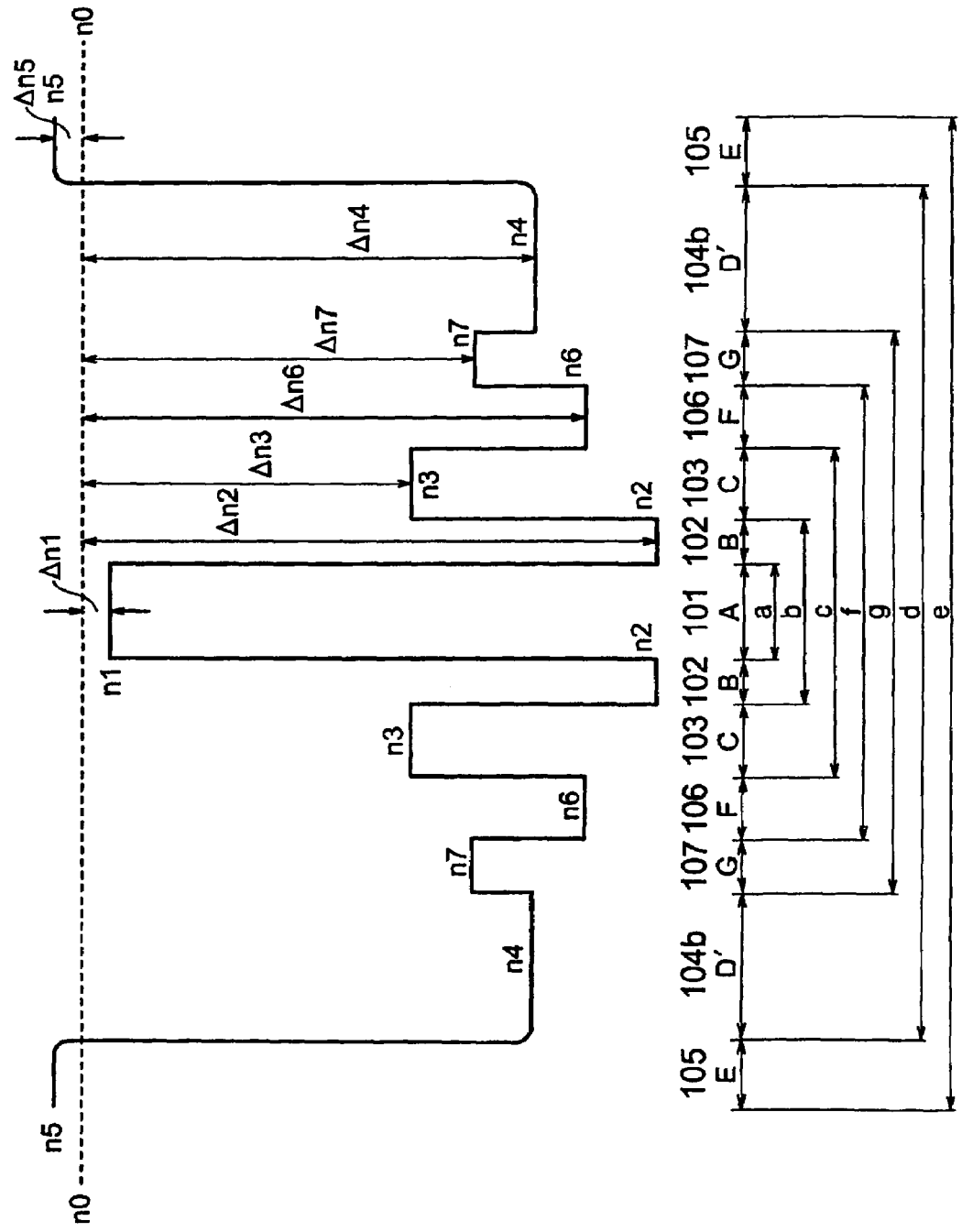
FIG. 5 is a view showing a configuration and refractive index distribution of an optical fiber according to a third embodiment of the present invention.

The outer diameter e of the cladding portion 105 of the single-mode optical fiber is usually 125 µm. The thickness of the cladding portion 105 formed around the fourth region (D) 104, which has outer diameter of d, depends on the number of optical propagation layers formed inside the cladding portion 105. For example, the cladding portion 105 of the optical fiber shown in FIG. 2 is thicker while the cladding portion 105 shown in FIGS. 4 and 5 is thinner.

An example of the outer diameters a to e of the first through fourth regions (core portions) 101 through 104 and the cladding portion (fifth region) 105 and the first through fifth relative refractive index differences Δn1 through Δn5 are listed in the following table 1.

TABLE 1

| Region | Outer diameter | Relative refractive index difference |
|---|---|---|
| (1) First region (A) 101 | a = 8 µm | Δn1 = −0.02 |
| (2) Second region (B) 102 | b = 10.4 µm | Δn2 = −0.41 |
| (3) Third region (C) 103 | c = 18.7 µm | Δn3 = −0.25 |
| (4) Fourth region (D) 104 | d = 111 µm | Δn4 = −0.30 |
| (5) Fifth region (E) 105 | e = 125 µm | Δn5 = +0.03 |

The outer diameter ratios b/a and c/a shown in the table 1 are:

$$b/a=1.3, c/a=2.3375$$

The thickness of the clad portion 105 is (125−111)/2=7 µm.

Requirements for Manufacturing Optical Fibers

In order to manufacture an optical fiber having first to fourth regions 101 to 104 with respective relative refractive index differences Δn1 through Δn4 shown in the table 1, a dopant for changing refractive index, such as germanium, and/or a dopant for lowering refractive index, such as fluorine, are prepared where appropriate to be doped in a soot synthetic raw material based silica.

Germanium is used to increase the refractive index. However, since too much germanium doped in the silica glass may cause a problem of Rayleigh scattering, an appropriate amount of germanium is preferably doped.

In addition, as fluorine is doped in the silica glass, the refractive index difference relative to the silica can be finely controlled, thereby obtaining a refractive index profile for realizing desired transmission characteristic.

As a result of an experiment made based on the above-mentioned technical background, the concentration of each of the dopants preferably falls within the range mentioned in the table 2 below, where the germanium concentration is indicated by $C_{Ge}$ (mol %) and the fluorine concentration is indicated by $C_F$ (mol %).

TABLE 2

| First region (A) 101 | $-0.1 < 0.096 \times C_{Ge} - 0.398 \times C_F < 0$ |
| Second region (B) 102 | $-0.5 \leq 0.096 \times C_{Ge} - 0.398 \times C_F \leq -0.2$ |
| Third region (C) 103 | $-0.4 \leq 0.096 \times C_{Ge} - 0.398 \times C_F \leq -0.1$ |
| Fourth region (D) 104 | $-0.5 < 0.096 \times C_{Ge} - 0.398 \times C_F < -0.1$ |

The coefficient of 0.096 means that 1 mol % germanium is doped to increase the relative refractive index difference by 0.096 and the coefficient of −0.398 means that 1 mol % fluorine is doped to decrease the relative refractive index difference by −0.398. Thus, by doping an appropriate amount of germanium and/or fluorine, the relative refractive index difference Δn1 of the first region (A) 101 is allowed to fall within the range of between −0.1 and 0.

In vitrification of the synthesized soot to form transparent glass, the soot is preferably annealed in an atmosphere including at least fluorine and chlorine. Particularly, in vitrifying soots which are to be used in the first region (A) 101 through the fourth region (D) 104, chlorine can be used to eliminate water contained in the soots, thereby reducing absorption loss by a hydroxyl group (OH group) which will become a trouble after drawing.

It is also possible not to have germanium doped in the soot synthetic raw material containing silicon in every of the first region (A) 101 to the fourth region (D) 104 ($C_{Ge}=0$). If the silica glass is doped with no germanium for adjusting the relative refractive index difference in all the region of the optical fiber, this means reduction of impurities mixed. This makes it possible to suppress the Rayleigh scattering and to reduce the transmission loss.

Or, it is also possible that in synthesizing a soot for the first region (A) 101, germanium is added to the soot synthetic raw material, while in synthesizing soots for the second region (B) 102 through the fifth region (E) 105, no germanium is added to the soot synthetic raw material.

Further it is possible that in synthesizing soots of the first region (A) 101 and the third region (C) 103 both having high refractive indexes, the soot synthetic raw material containing silicon is doped with germanium, while in synthesizing soots of the second region (B) 102, the fourth region (D) 104 and the cladding portion (outermost region) 105 having lower refractive indexes, the soot synthetic raw material containing silicon is not doped with germanium.

A method for manufacturing an optical fiber according to the present invention can provide an improved controllability on the refractive index distribution in the radial direction of the optical fiber.

With reference to FIGS. 3(a) to 3(o), an example of a method for manufacturing the above-mentioned WDM transmission single-mode optical fiber will be described below.

Formation of a Portion (Region) to be the First Region (A) 101

Step 1: As shown in FIG. 3(a), a burner 11 and a starting quartz bar 12 are used to synthesize a soot (soot element) 13, such as by the VAD method, which is to be the first region (A) 101 after vitrification at the next step.

Step 2: As shown in FIG. 3(b), the synthesized soot 13 is heated, for example in an atmosphere including $SiF_4$, to be a transparent glass 14. Then, the glass 14 is heated by a burner 15 and elongated to be formed into a glass 16 as shown in FIG. 3(c). This glass 16 finally becomes the first region (A) 101.

In the above-described example, only fluorine is used as a dopant so as to form the first region (A) having a refractive index n1 lower than the refractive index n0 of silica. However, as illustrated in the table 2, germanium and fluorine may be combined to be used as a dopant.

Formation of a Portion (Region) to be the Second Region (B) 102

Step 3: As shown in FIG. 3(d), a burner 17 is used to synthesize a soot 18 around the glass 16 by way of the OVD method, which soot is to be the second region (B) 102 after vitrification at the following step, and thereby to form a glass-soot composite 19.

Step 4: As shown in FIG. 3(e), the glass-soot composite 19 is heated, for example in an atmosphere including $SiF_4$, to be a transparent composite glass 20. Then, the composite glass 20 is heated by the burner 15 and elongated to be formed into a composite glass 21 as shown in FIG. 3(f).

In the above-described example, only fluorine is used as a dopant so as to form the second region (B) having a refractive index n2 lower than the refractive index n0 of silica. However, germanium and fluorine may be combined to be used as a dopant as illustrated in the table 2.

Formation of a Portion (Region) to be the Third Region (C) 103

Step 5: As shown in FIG. 3(g), a burner 17 is used to synthesize a soot 22 around the composite glass 21 by way of the OVD method, which soot is to be the third region (C) 103 after vitrification processing at the following step, and thereby to form a glass-soot composite 23.

Step 6: As shown in FIG. 3(h), the glass-soot composite 23 is heated, for example in an atmosphere including $SiF_4$, to be a transparent composite glass 24. Then, the composite glass 24 is heated by the burner 15 and elongated to be formed into a composite glass 25 as shown in FIG. 3(i).

In the above-described example, only fluorine is used as a dopant so as to form the third region (C) 103 having a refractive index n3 lower than the refractive index n0 of silica. However, germanium and fluorine may be combined to be used as a dopant as illustrated in the table 2.

Formation of a Portion (Region) to be the Fourth Region (D) 104

Step 7: As shown in FIG. 3(j), burner 17 is used to synthesize a soot 26 around the composite glass 25 by way of the OVD method, which soot is to be the fourth region (D) 104 after vitrification processing at the following step, and thereby to form a glass-soot composite 27.

Step 8: As shown in FIG. 3(k), the glass-soot composite 27 is heated, for example in an atmosphere including $SiF_4$, to be a transparent composite glass 28. Then, the composite glass 28 is heated by the burner 15 and elongated to be formed into a composite glass 29 as shown in FIG. 3(l).

In the above-described example, only fluorine is used as a dopant so as to form the fourth region (D) 104 having a refractive index n4 lower than the refractive index n0 of silica. However, germanium and fluorine may be combined to be used as a dopant as illustrated in the table 2.

Formation of a Portion (Region) to be the Fifth Region (E) 105

Step 9: As shown in FIG. 3(m), a burner 17 is used to synthesize a soot 30 around the composite glass 29 by way of the OVD method, which soot is to be the outermost, fifth region (E) (cladding portion) 105 after vitrification processing at the following step, and thereby to form a glass-soot composite 31.

Step 10: As shown in FIG. 3(n), the glass-soot composite 31 is heated and made transparent to form an optical fiber preform 32.

Basically, no dopant is doped during formation of the outermost region 105.

Formation of Optical Fiber

Step 11: As illustrated in FIG. 3(o), the optical fiber preform 32 is inserted onto the drawing furnace, and a lower end of the inserted optical fiber preform 32 is heated by a heater 33 and melted. Then, the optical fiber preform 32 is drawn to form a single-mode optical fiber with a refractive index distribution shown in FIG. 2.

In the above-described manufacturing method, assuming that the soot synthesizing processing and the vitrification processing are included in one step, it is possible to manufacture only in five steps a single-mode optical fiber preform having a core portion configured of plural layers as shown above.

EXAMPLES

An example based on the above-described first embodiment of the present invention will be described below.

Example 1

In the example 1, three kinds of samples are prepared by the aforementioned manufacturing method, which samples having different germanium concentrations $C_{Ge}$ (mol %) and fluorine concentrations $C_F$ (mol %) of the portions 101 through 104 of the optical fiber.

In this case, the refractive index differences Δn1 through Δn5 of the respective regions 101 through 105 of the optical fiber relative to the reference refractive index n0 of the silica glass which includes no dopant, the ratio b/a of the outer diameter b of the second region (B) 102 to the outer diameter a of the fist region (A) 101, and the ratio c/a of the outer diameter c of the third region (C) 103 to the outer diameter a of the first region (A) 101 are fixed as shown in the table 1 as above: Δn1=−0.02, Δn2=−0.41, Δn3=−0.25, Δn4=−0.30, Δn5=+0.03, b/a=1.30, and c/a=2.3375.

As to the samples 1 to 3, transmission characteristics including the transmission loss at 1,550 nm, the chromatic dispersion at 1,550 nm, and the dispersion slope at 1,550 nm, the effective area $A_{eff}$ at 1,550 nm, the cable cutoff wavelength $\lambda_{cc}$ and the macrobending loss on mandrel having an outer diameter of 20 mm (20 mmφ) were measured, which results are shown in the table 3, Also listed in the table 3 are desired characteristic requirements for comparison.

region and, on the other hand, fluorine added to lower the refractive index difference relative to the silica behaves like impurities, thereby increasing the Rayleigh scattering. Accordingly, it is noted that the addition amounts of the germanium and fluorine be restricted to the appropriate range.

In the samples 2 and 3, the data meets all the desired transmission characteristics. As to the transmission loss, the sample 3 shows a better result than the sample 2. This is because, by adding a small amount of germanium (0.03 mol %) to the first region (A) 101, matching of the glass viscosity is enhanced in an interface between the first region (A) 101 and the second region (B) 102 thereby to decrease residual stress-strain caused during drawing shown in FIG. 3(o) and to suppress loss due to the Rayleigh scattering. Hence, it is preferable that an appropriate amount of germanium is added to the first region (A) 101.

Thus, it has turned out that by optimizing the refractive index differences relative to silica and the ratio of the outer diameters of the first region (A) 101, the second region (B) 102 and the third region (C) 103, it is possible to obtain the desired transmission characteristics other than the transmission loss, and in order to reduce the transmission loss, for example, it is necessary to control dopant amounts of germanium and fluorine in the silica glass of the first region (A) 101.

Example 2

In this example 2, three samples A to C are prepared, which samples having different relative refractive index

TABLE 3

|  | Target Value | Sample 1 (Comparative example) | Sample 2 (Example 1 of Present invention) | Sample 3 (Example 2 of Present invention) |  |
|---|---|---|---|---|---|
| Ge Region 101, $C_{Ge-101}$ (mol %) |  | 0.03 | 0.00 | 0.03 | Δn1 |
| Region 102, $C_{Ge-102}$ (mol %) |  | 0.39 | 0.00 | 0.00 |  |
| Region 103, $C_{Ge-103}$ (mol %) |  | 0.15 | 0.00 | 0.00 |  |
| Region 104, $C_{Ge-104}$ (mol %) |  | 0.00 | 0.00 | 0.00 |  |
| F Region 101, $C_{F-101}$ (mol %) |  | 0.06 | 1.02 | 0.06 |  |
| Region 102, $C_{F-102}$ (mol %) |  | 0.12 | 0.63 | 1.03 |  |
| Region 103, $C_{F-103}$ (mol %) |  | 0.66 | 0.75 | 0.63 |  |
| Region 104, $C_{F-104}$ (mol %) |  | 0.75 | 0.75 | 0.75 |  |
| Transmission loss: dB/km | 0.185 or less | 0.191* | 0.178 | 0.169 | λ = 1550 nm |
| Chromatic dispersion: ps/nm · km | 19 ± 1 | 18.8 | 19.0 | 19.4 | λ = 1550 nm |
| Dispersion slope: ps/nm² · km | 0.06 ± 0.01 | 0.0598 | 0.0592 | 0.0595 | λ = 1550 nm |
| Aeff: μm² | 105 or more | 102* | 109 | 107 | λ = 1550 nm |
| λ cc: nm | 1530 or less | 1365 | 1349 | 1310 |  |
| Macrobending attenuation: dB/m | 10 or less | 7.7 | 5.6 | 3.1 | 20 mm φ |

Evaluation

The sample 1 is a comparative example while the samples 2 and 3 correspond to the optical fiber according to the example of the present invention. In the table 3, the mark * shows that the data does not meet the desired transmission characteristics.

The sample 1 (comparative example) is an example such that germanium is doped in the first region (A) 101 to the third region (C) 103, in which the chromatic dispersion, the dispersion slope, the cable cutoff wavelength $\lambda_{cc}$ and the macrobending loss meet the desired requirements, however, the transmission loss and the effective area $A_{eff}$ do not meet the desired requirements. The transmission loss in the comparative example is larger than the desired transmission loss because much germanium exists in the optical transmission differences Δn2 through Δn4 of the respective regions 102 through 104 of the optical fiber, different ratios b/a of the outer diameter b of the second region (B) 102 to the outer diameter a of the first region (A) 101, and different ratios c/a of the outer diameter c of the second region (C) 103 to the outer diameter a of the first region (A) 101.

Then, as to the samples 1 to 3, just like in the example 1, transmission characteristics including the transmission loss at 1,550 nm, the chromatic dispersion at 1,550 nm, and the dispersion slope at 1,550 nm, the effective area $A_{eff}$ at 1,550 nm, the cable cutoff wavelength $\lambda_{cc}$ and the macrobending loss on mandrel having an outer diameter of 20 mm (20 mmφ) were measured, which results are shown in the table 4. Also listed in the table 4 are above-mentioned desired characteristic requirements for comparison.

TABLE 4

| Items | | Target value | Sample A (Comparative example 1) | Sample B (Comparative example 2) | Sample C (Example of Present Invention) | Remarks |
|---|---|---|---|---|---|---|
| Relative refractive index difference (%) | $\Delta n1$ | | −0.02 | −0.02 | −0.02 | |
| | $\Delta n2$ | | −0.55 | −0.19 | −0.41 | |
| | $\Delta n3$ | | −0.45 | −0.08 | −0.25 | |
| | $\Delta n4$ | | −0.40 | −0.15 | −0.30 | |
| Diameter ratio | b/a | | 1.40 | 1.10 | 1.30 | |
| | c/a | | 2.38 | 2.31 | 2.34 | |
| Transmission loss: dB/km | | 0.185 or less | 0.188* | 0.175 | 0.172 | $\lambda$ = 1550 nm |
| Chromatic dispersion: ps/mm · km | | 19 ± 1 | 19.4 | 20.6* | 19.8 | $\lambda$ = 1550 nm |
| Dispersion slope: ps/nm² · km | | 0.06 ± 0.01 | 0.0595 | 0.0603 | 0.0587 | $\lambda$ = 1550 nm |
| Aeff: μm² | | 105 or more | 101* | 119 | 114 | $\lambda$ = 1550 nm |
| $\lambda$ cc: nm | | 1530 or less | 1310 | 1750* | 1525 | |
| Macrobending attenuation: dB/m | | 10 or less | 3.1 | 27.3* | 8.5 | 20 mm $\phi$ |

The samples A and B are comparative examples 1 and 2 and the sample C corresponds to an example of the present invention. The mark * indicates that the data does not meet the desired transmission characteristic requirements. The sample C meets all the desired transmission characteristic requirements.

In the sample A of the comparative example 1, absolute values of the relative refractive index differences $\Delta n2$ through $\Delta n4$ are large, and the chromatic dispersion, the dispersion slope, the cable cutoff wavelength $\lambda_{cc}$ and the macrobending loss meet the desired requirements, the transmission loss is larger than the desired value and the effective area $A_{eff}$ is smaller than the desired value.

In the sample B of the comparative example 2, absolute values of the relative refractive index differences $\Delta n2$ through $\Delta n4$ are small and the outer diameter ratio b/a is also small. As a result, the transmission loss, the dispersion slope and the effective area $A_{eff}$ meet the desired requirements, however, the chromatic dispersion, the cutoff wavelength and the macrobending loss do not meet the desired requirements.

As is clear from the above, it is required for meeting the desired requirements to set the absolute values of the relative refractive index differences $\Delta n2$ through $\Delta n4$ and the outer diameter ration b/a within the appropriate range.

Other Embodiments

The first embodiment and the relative refractive index difference $\Delta n1$ of the examples 1 and 2 based thereon have been described with use of an optical fiber of which the core region (optical transmission region) has a three-layer configuration. However, an optical fiber according to the present invention is not prevented from having a complex cross section and refractive index profile. Following description will be made about other illustrative embodiments of an optical fiber of the present invention.

Second Embodiment

With reference to FIG. 4, a second embodiment of the present invention is described below.

An optical fiber according to the second embodiment of the present invention shown in FIG. 4 is a four-layer optical fiber having a first additional region 106 (or sixth optical signal propagation region or sixth region (F)) between the third region (C) 103 and the fourth region (D) 104 of the optical fiber of the first embodiment shown in FIG. 2, the first additional region 106 having outer diameter of "f", sixth refractive index of "n6" and sixth refractive index difference of "$\Delta n6$" relative to the reference refractive index n0 of silica. The relative refractive index difference $\Delta n6$ is defined in conformance with the equation 1.

The first region (A) 101 through the third region (C) 103 according to this embodiment are the same as the first region (A) 101 through the third region (C) 103 of an optical fiber of the first embodiment.

With the assumption that the outer diameter of the outermost region 105 is the same as that of the first embodiment and the outer diameters of the first region (A) 101 through the third region (C) 103 are the same as those of the first embodiment, since the first additional core region 106 is added, the thickness of the fourth region (D) 104a of the second embodiment (=d−f) becomes smaller than the thickness of the fourth region (D)) 104 of the first embodiment (=d−c).

The relative refractive index difference $\Delta n4$ of the fourth region (D) 104a is a negative value, an absolute value thereof being smaller than an absolute value of the sixth relative refractive index difference $\Delta n6$ and larger than an absolute value of the third relative refractive index difference $\Delta n3$. The sixth relative refractive index difference $\Delta n6$ is a negative value, an absolute value thereof being smaller than an absolute value of the second relative refractive index difference $\Delta n2$ and larger than an absolute value of the third relative refractive index difference $\Delta n3$. Accordingly, the refractive indexes satisfy the following relation:

n5>n0>n1>n3>n4>n6>n2

Figure 3:
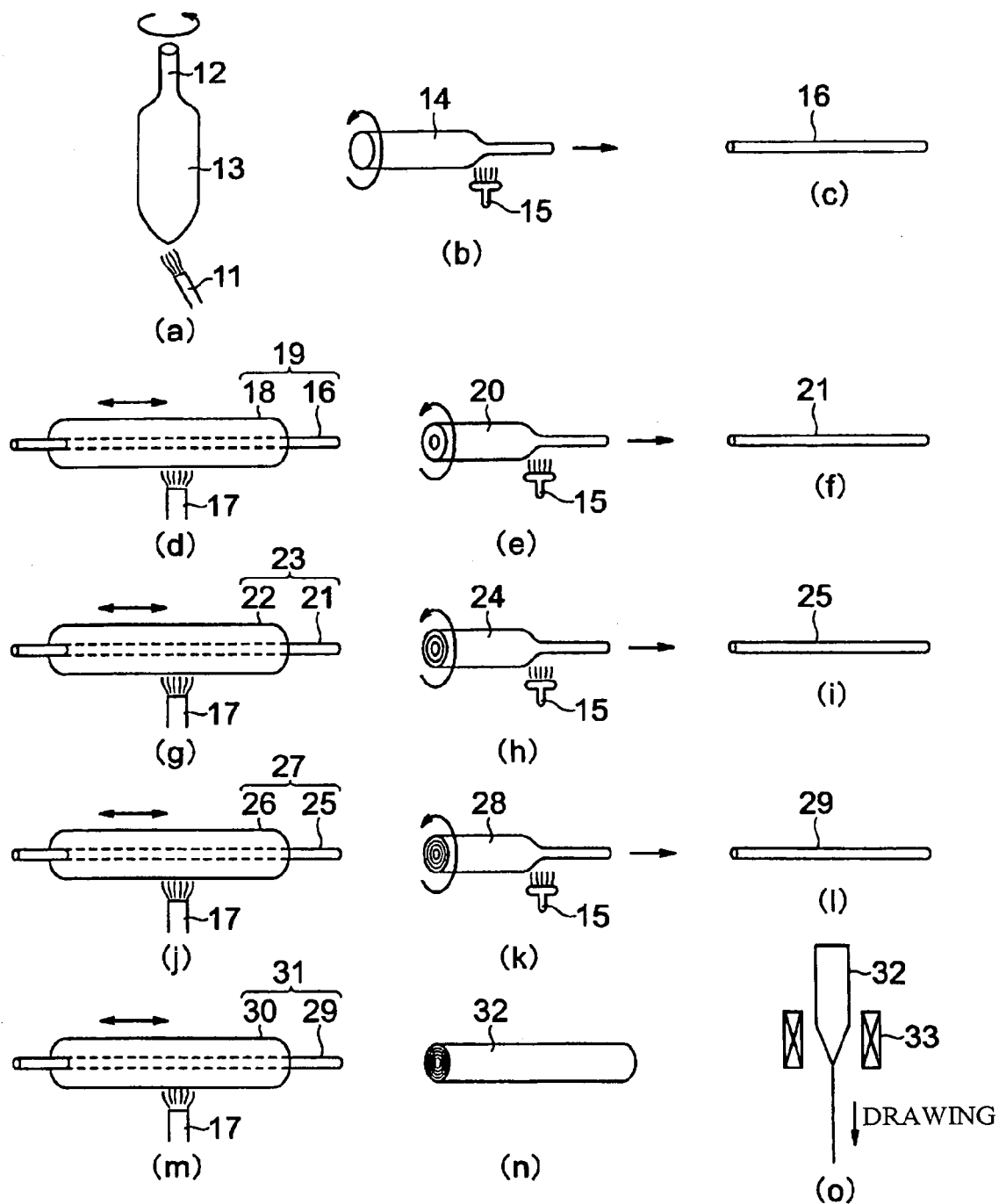
FIG. 3(a) to FIG. 3(o) show an example of a manufacturing method of the optical fiber shown in FIG. 2.

The optical fiber shown in FIG. 4 is manufactured by forming the first additional region (or sixth core region or sixth optical signal propagation region) 106 after forming the third region (C) 103 described with reference to FIG. 3. The method of forming of the first additional region (F) 106 is the same as the forming method of the second region (B) 102. However, the germanium concentration and fluorine concentration are different.

The aforementioned desired characteristic requirements are also imposed on the optical fiber of the second embodiment, and in fact, the optical fiber of the second embodiment satisfies such requirements.

Third Embodiment

With reference to FIG. 5, an optical fiber according to a third embodiment of the present invention will be described below.

An optical fiber according to the third embodiment of the present invention shown in FIG. 5 is a five-layer optical fiber having a second additional region 107 (or seventh optical signal propagation region or seventh region (G)) between the first additional region (F) 106 and the fourth region O) 104b of the optical fiber of the second embodiment shown in FIG. 4, the second additional region 107 having outer diameter of "g", seventh refractive index of "n7" and seventh refractive index difference of "Δn7" to the reference refractive index n0 of silica. The seventh relative refractive index difference Δn7 is defined in conformance with the equation 1.

The first region (A) 101 through the third region (C) 103 according to this embodiment are the same as the first region (A) 101 through the third region (C) 103 of an optical fiber of the first and second embodiments.

With the assumption that the outer diameter of the outermost region 105 is the same as that of the first and second embodiments and the outer diameters of the first region (A) 101 through the third region (C) 103 are the same as those of the first and second embodiments, since the second additional core region 107 is added in the third embodiment, the thickness of the fourth region (D) 104b (=d−g) is smaller than the thickness of the fourth region (D) 104a of the second embodiment (=d−f).

The relative refractive index difference Δn4 of the fourth region (D″) 104b is a negative value, an absolute value thereof being smaller than an absolute value of the sixth relative refractive index difference Δn6 and larger than an absolute value of the third relative refractive index difference Δn3. The sixth relative refractive index difference Δn6 is a negative value, an absolute value thereof being smaller than an absolute value of the second relative refractive index difference Δn2 and lager than an absolute value of the third relative refractive index difference Δn3.

The seventh relative refractive index difference Δn7 is a negative value, an absolute value thereof being larger than an absolute value of the third relative refractive index difference Δn3 and smaller than an absolute value of the sixth relative refractive index difference Δn6. Accordingly, the refractive indexes satisfy the following relation:

n5>n0>n1>n3>n7>n4>n6>n2

The optical fiber shown in FIG. 5 is manufactured by, after forming the third region (C) 103 described with reference to FIG. 3, forming the first additional region (or sixth core region or sixth optical signal propagation region) 106 and further forming the second additional region (or seventh core region or seventh optical signal propagation region) 107.

The method of forming of the first additional region (F) 106 and the second additional region (G) 107 is the same as the forming method of the second region (B) 102. However, the germanium concentration and fluorine concentration are different.

The above-mentioned desired characteristic requirements are also imposed on the optical fiber of the third embodiment, and in fact, the optical fiber of the third embodiment satisfies such requirements.

The present invention has another object to provide an optical fiber which has an increased $A_{eff}$ and reduced transmission loss while maintaining a chromatic dispersion thereof at an appropriate level.

Figure 6:
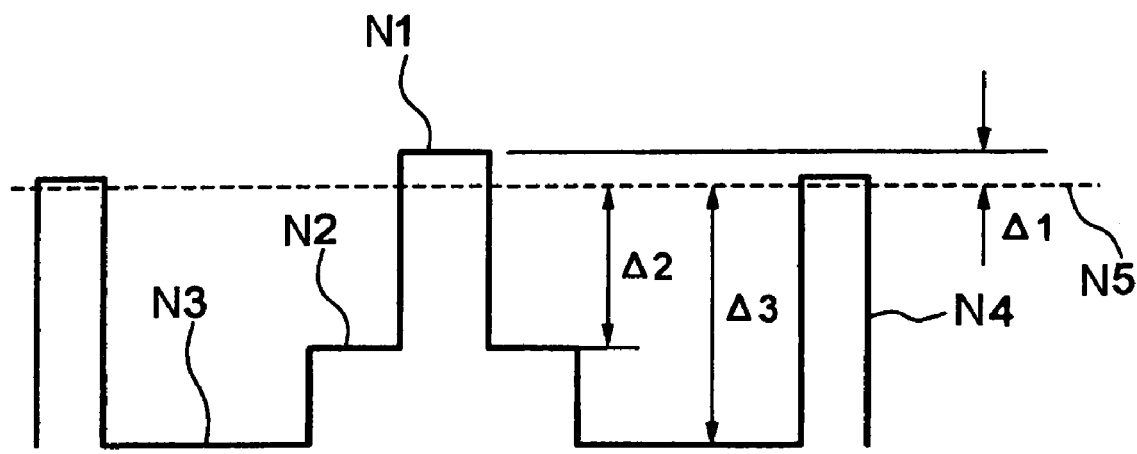
FIG. 6 is a schematic explanatory view showing an example of refractive index distribution of an optical fiber according to the present invention.

Another embodiment of the present invention is described below with reference to the drawings. FIG. 6 is a schematic explanatory view showing an example of refractive index distribution of an optical fiber according to the present invention. In FIG. 6, a center core N1 is positioned as a center, side core N2 portions are positioned at the outside of the center core N1, first cladding N3 portions and second cladding N4 portions are successively positioned at the outsides of the side core portions N2.

The center core N1 has outer diameter of a (not shown), and has the maximal refractive index difference Δ1 relative to the refractive index level N5 of silica indicated by the refractive index of silica as a reference. The side core N2 has outer diameter of b (not shown) and, in the same way as the center core N1, the maximal refractive index difference Δ2 relative to the refractive index level N5 of silica. Also, the first cladding N3 has the maximal refractive index difference Δ3 relative to the refractive index level N5 of silica, and the second cladding N4 has almost the same refractive index level as the refractive index level N5 of silica.

In the present embodiment, the refractive index difference Δ2 relative to the refractive index level N5 of silica is defined as follows:

(1) If the side core N2 has no maximal refractive index point, the refractive index difference Δ2 is a value at a point where the gradient of the refractive index curve is the smallest.

(2) If the side core N2 has a maximal refractive index point, the refractive index difference Δ2 is a value of the refractive index difference (maximal refractive index value) relative to the silica at the maximal refractive index point. If the side core N2 has plural maximal refractive index points, the refractive index difference Δ2 is the highest one among the plural maximal refractive index points.

Here, if the side core N2 has a maximal refractive index point, there exists a minimal refractive index point. When a minimum of the refractive index difference (minimal refractive index value) relative to the first cladding at the minimal refractive index point is equal to or more than half of the difference between Δ2 and Δ3, the side core N2 is configured of one layer.

In addition, when the refractive index curve of the center core N1 is made analogous to an α curve, the boundary of the center core N1 and the side core N2 is a point where the α curve crosses a line of relative refractive index difference of zero. The α curve is expressed by the following equation:

$$\Delta n(r) = \Delta n(0) \times \{1 - (2r/a)^\alpha\} \quad \text{(equation 2)}$$

wherein $0 \leq r \leq a/2$

In the equation, r indicates a distance from the center, a is an outer diameter of the center core, Δn(r) indicates a refractive index at the distance of r, Δn(0) indicates a refractive index at the core center, and α indicates a refractive index profile coefficient.

The boundary of the side core N2 and the first cladding N3 is a point where a line which passes a point of one tenth of the refractive index difference Δ2 of the side core N2 relative to the first clad N3 and extends in the relative refractive index difference varying direction crosses a line of the relative refractive index difference Δ3.

When the above-mentioned equation 2 is used to make the refractive index profile of the center core analogous, its boundary with the side core can be obtained. As shown in the table of FIG. 8, a value Δ1, a value Δ2, a value (Δ) of the first clad and the above-mentioned values a, b are used in calculation to obtain following values.

A chromatic dispersion shows signal group dispersion and is indicated by the unit of (ps/nm/km). A dispersion slope shows a change rate at the wavelength of the group dispersion and is indicated by the unit of (ps/nm²/km). The effective area $A_{eff}$ shows extending of an optical signal in the direction perpendicular to the transmitting direction of the signal, and is indicated by the unit of μm². The transmission loss expresses attenuation of power and is indicated by the unit of dB/km. Accordingly, these values are used to evaluate the optical fiber, thereby to estimate its transmission capacity.

An optical fiber according to the present embodiment is an optical fiber configured by a center core, a side core, a first cladding and a second cladding in this order from the inside of the optical fiber, in which the refractive index difference Δ1 of the center core relative to silica falls within the range of between −0.20% and 0.20% inclusive, the refractive index difference Δ2 of the side core relative to silica falls within the range of between −0.45% and −0.05% inclusive, the refractive index difference Δ3 of the first clad relative to silica falls within the range of between −0.50% and −0.20%, the refractive index difference Δ1 of the center core relative to silica, the refractive index difference Δ2 of the side core relative to silica and the refractive index difference Δ3 of the first clad relative to silica satisfy a relationship of Δ3<Δ2<Δ1. In addition, the ratio a/b of the outer diameter a of the center core to the outer diameter b of the side core falls within the range of between 0.3 and 0.8, the second cladding has higher viscosity than the center core, an absolute value of the chromatic dispersion at 1,550 nm is in the range of between 4 ps/nm/km and 20 ps/nm/km, the dispersion slope at 1,550 nm is in the range of between 0.05 ps/nm$^2$/km and 0.08 ps/nm$^2$km, the transmission loss at 1,550 nm is equal to or less than 0.2 dB/km and the effective area $A_{eff}$ at 1,550 nm is equal to or more than 80 μm$^2$.

Here, the refractive index difference Δ1 of the center core relative to silica falls within the range of between −0.20% and 0.20% inclusive. When the refractive index difference Δ1 exceeds 0.20%, it is required to increase an amount of dopant for raising the refractive index, such as Ge, which will result in increasing of the transmission loss. On the other hand, when the refractive index difference Δ1 is less than −0.20%, it is required to increase an amount of dopant for lowering Δ, such as F, which will results in increase of the mission loss. Hence, in the present invention, the refractive index difference Δ1 is set to fall within the range of between −0,20% and 0.20% inclusive.

The refractive index difference Δ2 of the side core relative to silica falls within the range of between −0.45% and −0.05% inclusive. If the refractive index difference Δ2 exceeds −0.05%, the cable cutoff wavelength $λ_{cc}$ will become larger. If the refractive index difference Δ2 falls below −0.45%, the optical fiber will be sensitive to macrobending. Accordingly, in this embodiment, the refractive index difference Δ2 is set to fall within the range of between −0.45% and −0.05%.

The refractive index difference Δ3 of the first cladding relative to silica falls within the range of between −0.50% and −0.20% inclusive. If the refractive index difference Δ3 exceeds −0.20%, the optical fiber will be sensitive to macrobending. If the refractive index difference Δ3 falls below −0.50%, the effective area ($A_{eff}$) will become smaller. Accordingly, in this embodiment, the refractive index difference Δ3 is set to fall within the range of between −0.50% and −0.20% inclusive.

The refractive index difference Δ1 of the center core relative to silica, the refractive index difference Δ2 of the side core relative to silica and the refractive index difference Δ3 of the first cladding relative to silica satisfy a relationship of Δ3<Δ2<Δ1. By satisfying this relationship, it is possible to achieve an optical fiber suitable for WDM transmission.

Further, the ratio a/b of the outer diameter a of the center core to the outer diameter b of the side core falls within the range of between 0.3 and 0.8 inclusive. By keeping the ratio within this range, it is possible to achieve an optical fiber which has increased effective area ($A_{eff}$) and is resistant to macrobending. If the ratio exceeds 0.8, the cutoff wavelength will become larger and if the ratio falls below 0.3, the effective area ($A_{eff}$) will become smaller.

The second cladding has higher viscosity than the center core. If the viscosity of the second cladding is smaller than that of the center core, there will remain residual stress-strain in the center core of the optical fiber after drawing and it will become difficult to achieve 0.2 dB/km or less transmission loss The absolute value of the dispersion value at 1,550 nm is in the range of between 4 ps/nm/km and 20 ps/nm/km inclusive. If the absolute value exceeds 20 ps/nm/km, the transmission speed will be limited due to wavelength distortion by the accumulated dispersion, and if the absolute value is below the 4 ps/nm/km, there will likely occur non-linearity effects such as four wave mixing and also, the transmission speed will be limited.

Further, the dispersion slope at 1,550 nm is in the range of between 0.05 ps/nm$^2$/km and 0.08 ps/nm$^2$/km. If the dispersion slope exceeds 0.08 ps/nm$^2$/km, the optical fiber will become unsuitable for the DWDM transmission.

Furthermore, the transmission loss at 1,550 nm is equal to or less than 0.2 dB/km, If the transmission loss exceeds 0.2 dB/km, power attenuation will be increased and high power of incident light will be required, resulting in increase in the non-linearity effect.

Furthermore, the effective area $A_{eff}$ at the wavelength 1,550 nm is equal to or more than 80 μm$^2$. If the effective area $A_{eff}$ falls below 80 μm$^2$, the non-linearity effect will be increased.

Another embodiment of the present invention is characterized in that the above-described optical fiber is used in at least a part of a transmission channel. This is advantageous in that, as compared with a conventional optical fiber for transmission, an optical fiber of the present invention presents low transmission loss and an increased $A_{eff}$ thereby reducing the non-linearity effect.

EXAMPLES

Examples 3 through 5

As examples of the present invention, the inventors have examined change in characteristics of an optical fiber with a refractive index distribution shown in FIG. 6, when changing a parameter. Here, the parameter is Δ1: $Δ1=(n_1^2−n_s^2)/(2n_1^2)×100(\%)$ in which $n_1$ is a refractive index of the center core 1 and $n_s$ is a refractive index of silica. And it is assumed that the refractive index profile of the center core is shown in the form of steps and there is no maximum refractive index point in the side core.

The result of this is shown in the table 5 on FIG. 8. Here in the table 5, Δ1 value, Δ2 value and the first cladding value are shown in the unit of %. The ratio a/b is a ratio value of the outer diameter of the center core to that of the side core. Chromatic dispersion is shown in the unit of ps/nm/km, the dispersion slope in the unit of ps/nm$^2$/km, the transmission loss in the unit of dB/km, and $A_{eff}$ is shown in the unit of μm$^2$. For reference, the cable cutoff wavelength $λ_{cc}$ is shown in the unit of nm.

Comparative Example

Figure 7:
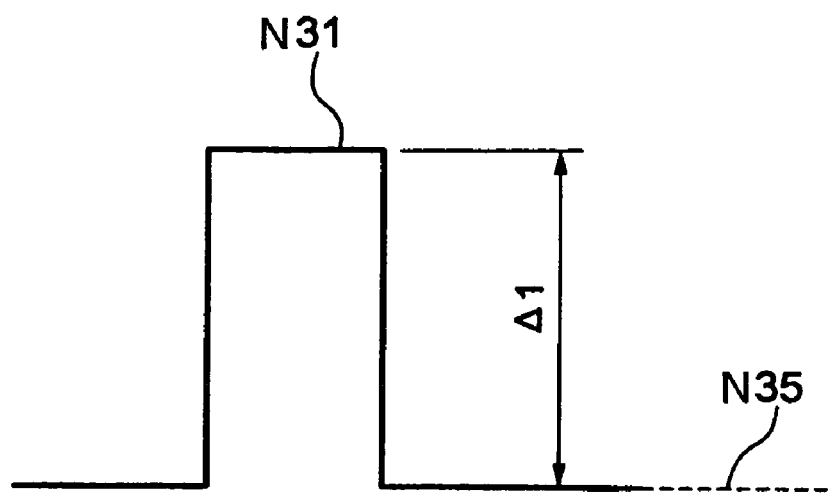
FIG. 7 is a schematic view showing refractive index distribution of a comparative example.

As a comparative example, we prepared an optical fiber having a refractive index profile shown in FIG. 7 and examined characteristics of $\Delta 1 = (n_{31}^2 - n_s^2)/(2n_{31}^2) \times 100$ (%) (in which $n_{31}$ is a refractive index if the core 31 and $n_s$ is a refractive index) of the optical fiber. This examination results are also shown in the table 5 on FIG. 8.

As shown in the table 5, the optical fiber according to any of the examples 3 to 5 has characteristics suitable for the WDM optical transmission due to optimizing of the refractive index profile. However, since the optical fiber of the comparative example is low in $\Delta$, the chromatic dispersion and the cable cutoff wavelength of the optical fiber are not suitable for the WDM optical transmission.

Next, an optical fiber of the example 3 and a line-type dispersion managed optical fiber having a length which almost completely compensates for the dispersion of the former optical fiber were used to configure an optical transmission channel. Likewise, by use of optical fibers of the examples 4, 5 and the comparative example optical transmission channels were configured. Then, an experiment was performed under the condition that as a requirement of a WDM optical signal, sixteen 10 Gbps waves are evenly arranged in the wavelength range of between 1,530 to 1,560 nm and the length of each of optical fibers of the examples 3 to 5 and comparative examples are set 10 km, which experiment result is shown in the table 5 of FIG. 8.

As is seen from table 5, the optical transmission channel which uses an optical fiber according to any of the examples 3 to 5 has characteristics suitable for the WDM optical transmission while the optical transmission channel which uses an optical fiber of the comparative example is not suitable for the WDM optical transmission. An optical transmission channel according to the present invention is not limited to such an optical transmission channel as described above, and may be realized in various embodiments. For example, an optical transmission channel of the present invention may be realized by using a dispersion managed optical fiber module or the like instead of a line-type dispersion managed optical fiber.

According to the present invention, it is possible to achieve an optical fiber with excellent transmission characteristics, having a zero dispersion wavelength in the vicinity of 1,300 nm (1.3 μm). Such an optical fiber advantageously serves as a WDM transmission single-mode optical fiber.

Further, according to the present invention, it is possible to manufacture such optical fibers as described above stably.

Furthermore, according to the present invention, it is possible to facilitate control on tension during drawing of an optical fiber.

Furthermore, according to the present invention, it becomes possible to achieve an optical fiber and a transmission channel both suitable for the WDM transmission.

What is claimed is:

1. An optical fiber comprising:
   a first region provided in a center of the optical fiber, having a refractive index difference $\Delta n1$ relative to a refractive index n0 of silica and an outer diameter of a;
   a second region formed around said first region, having a refractive index difference $\Delta n2$ relative to the refractive index n0 of silica and an outer diameter of b;
   a third region formed around said second region, having a refractive index difference $\Delta n3$ relative to the refractive index n0 of silica and an outer diameter of c;
   a fourth region formed around said third region, having a refractive index difference $\Delta n4$ relative to the refractive index n0 of silica and an outer diameter of d; and
   a fifth region formed around said fourth region, having a refractive index difference $\Delta n5$ relative to the refractive index n0 of silica and an outer diameter of e,
   in which the refractive index differences $\Delta n1$ through $\Delta n5$ satisfy a relationship as follows:

$\Delta n2 < \Delta n4 < \Delta n3 < \Delta n1$ $\Delta n1, \Delta n2, \Delta n3, \Delta n4 < 0$ $\Delta n5 > 0$.

2. The optical fiber as claimed in claim 1, wherein the outer diameter a of said first region, the outer diameter b of said second region and the outer diameter c of said third region satisfy a relationship as follows:

$1.20 \leq b/a \leq 2.00$ $1.44 \leq c/a \leq 4.00$.

3. The optical fiber as claimed in claim 1, wherein the refractive index differences $\Delta n1$, $\Delta n2$ and $\Delta n3$ are defined as follows:

$-0.1\% < \Delta n1 < 0\%$ $-0.5\% \leq \Delta n2 \leq -0.2\%$ $-0.4\% \leq \Delta n3 \leq -0.1\%$.

4. The optical fiber as claimed in claim 1, wherein the outer diameter e of said fifth region and the outer diameter d of said fourth region satisfy a relationship as follows:

$0.040 \leq \{(e-d)/2\}/e \leq 0.096$.

5. The optical fiber as claimed in claim 1, wherein the outer diameter e of said fifth region and the outer diameter d of said fourth region satisfy a relationship as follows:

$e = 125$ μm $5$ μm $\leq \{(e-d)/2\} \leq 12$ μm.

6. An optical transmission channel of which an optical fiber as claimed in claim 1 is used in at least one part.

7. A method for manufacturing an optical fiber which includes:
   a first region provided in a center of the optical fiber, having a refractive index difference $\Delta n1$ relative to a refractive index n0 of silica and an outer diameter of a;
   a second region formed around said first region, having a refractive index difference $\Delta n2$ relative to the refractive index n0 of silica and an outer diameter of b;
   a third region formed around said second region, having a refractive index difference $\Delta n3$ relative to the refractive index n0 of silica and an outer diameter of c;
   a fourth region formed around said third region, having a refractive index difference $\Delta n4$ relative to the refractive index n0 of silica and an outer diameter of d, and
   a fifth region formed around said fourth region, having a refractive index difference $\Delta n5$ relative to the refractive index n0 of silica and an outer diameter of e,
   in which the refractive index differences $\Delta n1$ through $\Delta n5$ satisfy a relationship as follows:

$\Delta n2 < \Delta n4 < \Delta n3 < \Delta n1$ $\Delta n1, \Delta n2, \Delta n3, \Delta n4 < 0$ $\Delta n5 > 0$, a zero dispersion wavelength of the optical fiber falls within a range of between 1,250 nm and 1,350 nm inclusive, the first region has a germanium concentration of $C_{Ge1}$ (mol %) and a fluorine concentration of $C_{F1}$ (mol %), the second region has a germanium concentration of $C_{Ge2}$ (mol %) and a fluorine concentration of $C_{F2}$ (mol %), the third region has a germanium concentration of $C_{Ge3}$ (mol %) and a fluorine concentration of $C_{F3}$ (mol %), the fourth region has a germanium concentration of $C_{Ge4}$ (mol %) and a fluorine concentration of $C_{F4}$ (mol %), and the germanium concentrations $C_{Ge1}$ through $C_{Ge4}$ and the fluorine concentrations $C_{F1}$ through $C_{F4}$ satisfy a relationship as follows:

$$-0.1 < 0.096 \times C_{Ge1} - 0.398 \times C_{F1} < 0$$

$$-0.5 \leq 0.096 \times C_{Ge2} - 0.398 \times C_{F2} \leq -0.2$$

$$-0.4 \leq 0.096 \times C_{Ge3} - 0.398 \times C_{F3} \leq -0.1$$

$$-0.5 < 0.096 \times C_{Ge4} - 0.398 \times C_{F4} < -0.1,$$

said method wherein, in synthesizing soots which are to be said first through fourth regions, respective soot synthetic raw materials including silica are doped with predetermined amounts of germanium and/or fluorine to synthesize the soots, and in vitrification of the soots to form a transparent glass, the soots are sintered in an atmosphere including fluorine and/or chlorine.

8. The method as claimed in claim 7, comprising:

a first step of synthesizing a first soot, which is to be the first region, and heating and vitrifying the first soot to form a first glass;

a second step of synthesizing a second soot, which is to be the second region, around the first glass formed at said first step and heating and vitrifying an obtained first glass-soot composite to form a first composite glass;

a third step of synthesizing a third soot, which is to be the third region, around the first composite glass formed at said second step and heating and vitrifying an obtained second glass-soot composite to form a second composite glass;

a fourth step of synthesizing a fourth soot, which is to be the fourth region, around the second composite glass formed at said third step and heating and vitrifying an obtained third glass-soot composite to form a third composite glass;

a fifth step of synthesizing a fifth soot, which is to be the fifth region, around the third composite glass formed at said fourth step and heating and vitrifying an obtained fourth glass-soot composite to form a fourth composite glass, which is then formed into an optical fiber preform; and a sixth step of heating and drawing an end of the optical fiber preform to form the optical fiber.

* * * * *

UNITED STATES PATENT AND TRADEMARK OFFICE
CERTIFICATE OF CORRECTION

PATENT NO. : 7,095,940 B2 Page 1 of 1
APPLICATION NO. : 10/674338
DATED : August 22, 2006
INVENTOR(S) : Hayami et al.

It is certified that error appears in the above-identified patent and that said Letters Patent is hereby corrected as shown below:

On the title page, Item (12) and Item (75), the Inventor's information is incorrect. Item (12) and Item (75) should read:

-- (12)   United States Patent
          Hayami         --

-- (75)   Inventor:  Shuhei Hayami, Tokyo (JP)  --

Signed and Sealed this

Fifth Day of December, 2006

JON W. DUDAS
*Director of the United States Patent and Trademark Office*